Feb. 16, 1971

E. L. BROWN

3,563,052

FREEZER CUSHION FOR ABSORPTION REFRIGERATION MACHINE

Filed Sept. 3, 1968

INVENTOR.
EARL L. BROWN.
BY James E Schardt
ATTORNEY.

United States Patent Office 3,563,052
Patented Feb. 16, 1971

3,563,052
FREEZE CUSHION FOR ABSORPTION
REFRIGERATION MACHINE
Earl L. Brown, Indianapolis, Ind., assignor to Carrier Corporation, Syracuse, N.Y., a corporation of Delaware
Filed Sept. 3, 1968, Ser. No. 756,810
Int. Cl. F25b 15/04; F28f 19/04
U.S. Cl. 62—476
2 Claims

ABSTRACT OF THE DISCLOSURE

An absorption refrigeration machine employing a water chiller with a central resilient column which is deformable by water pressure created by freezing of the water in the chiller to provide a passage for flow of water from the interior of the ice block formed in the chiller to prevent damage to the chiller caused by expansion of the ice.

BACKGROUND OF THE INVENTION

In an absorption refrigeration machine utilizing chilled water as the heat transfer medium, the chiller may be subjected to ambient temperatures below the freezing point of water during winter shutdown. To eliminate the necessity for draining the chilled water circuit to prevent ice damage to the system, it is desirable to provide a chiller which is unaffected by ice formation therein.

SUMMARY OF THE INVENTION

This invention relates to an absorption refrigeration machine including a chiller to cool water utilized as the heat exchange medium. The chiller is provided with a central resilient column to absorb a portion of the forces created by the expansion of the ice and to deform under pressure from the portion of the unfrozen water in the center of the ice block to allow a portion of the water to escape from the center of the block.

DESCRIPTION OF THE PREFERRED EMBODIMENT

Figure 1:
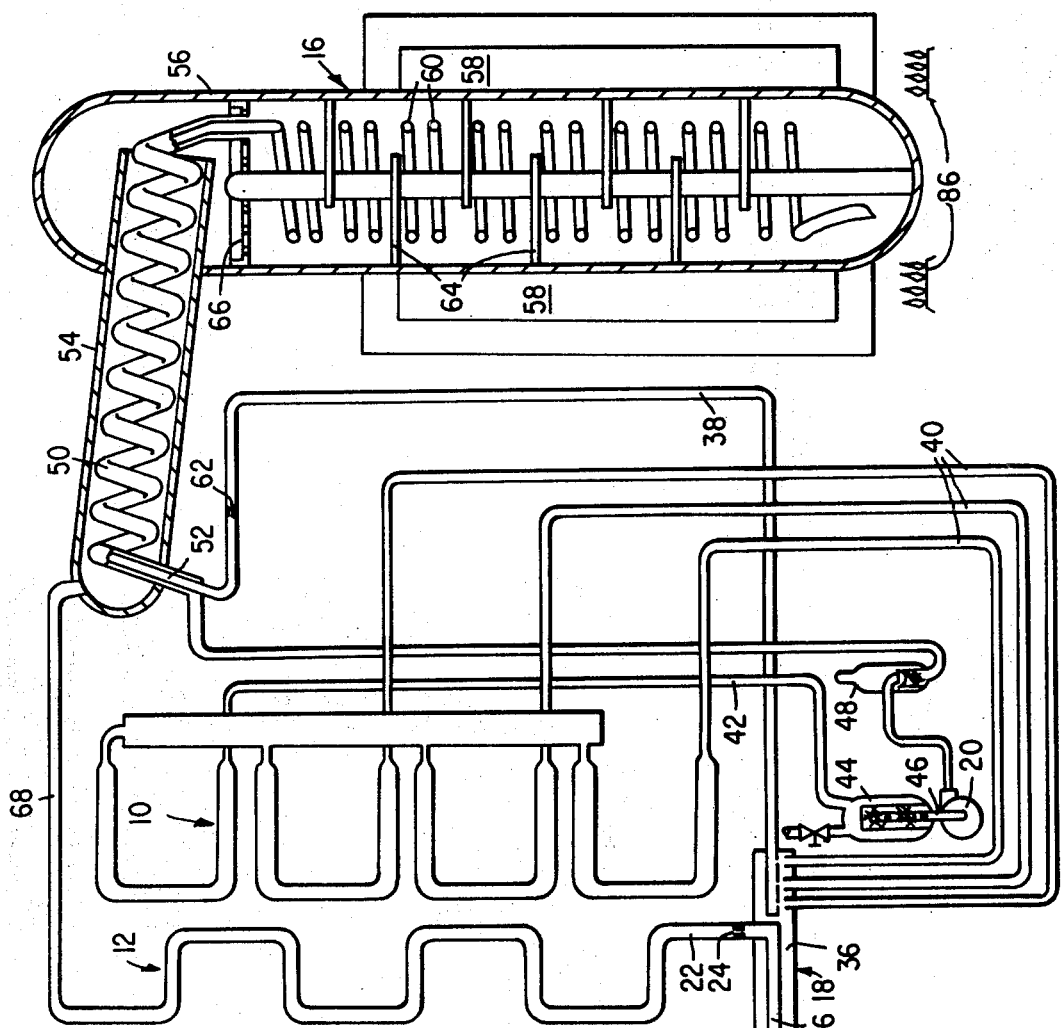
FIG. 1 is a schematic flow diagram of an absorption refrigeration machine.

Referring to FIG. 1 of the drawings there is shown a refrigeration system comprising an absorber 10, a condenser 12, an evaporator or chiller 14, a generator 16 and a combination liquid suction heat exchanger-vapor distributor 18 connected to provide refrigeration. A pump 20 is employed to circulate weak absorbent solution from absorber 10 to generator 16. As used herein the term "weak absorbent solution" refers to solution which is weak in absorbent power and the term "strong absorbent solution" refers to a solution which is strong in absorbent power. A suitable absorbent for use in the system described is water and a suitable refrigerant is ammonia.

Liquid refrigerant condensed in condenser 12 passes through refrigerant liquid passage 22 and refrigerant restrictor 24 to heat exchange tube 26 of liquid suction heat exchange 18. The liquid refrigerant which is cooled in tube 26 passes through refrigerant restriction 28 into heat exchanger 30 of chiller 14.

A heat exchange medium such as water is passed over the exterior of heat exchanger 30 where it is chilled by giving up heat to evaporate the refrigerant within the heat exchanger. The chilled heat exchange medium passes out of chiller 14 through line 32 to suitable remote heat exchangers (not shown) after which it is returned to the chiller through inlet 34 for rechilling.

The cold refrigerant evaporated in heat exchanger 30 passes through refrigerant vapor passage 36 of liquid suction heat exchanger 18 in heat exchange relation with liquid refrigerant passing through tube 26. Strong solution which is supplied from the generator to the combination liquid suction heat exchanger-vapor distributor 18 through line 38 is discharged into absorber supply lines 40 to induce refrigerant vapor from passage 36 into tubes 40. The strong solution with the refrigerant vapor therein is supplied to absorber 10 where cooling medium, preferably ambient air is passed over the surface of the absorber in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

Cold weak absorbent solution passes from absorber 10 through a line 42 into pump inlet tank 44. Weak solution from inlet tank 44 is supplied to weak solution pump 20 through line 46. Liquid from pump 20 passes through pump discharge tank 48 to rectifier heat exchange coil 50. The weak solution passes through coil 50 in heat exchange relation with hot strong solution pasing through heat exchange coil 52 disposed within coil 50 and with hot refrigerant vapor flowing through rectifier shell 54 in contact with the outer surface of coil 50. The weak solution from coil 50 is discharged into the upper portion of generator 16 along with any vapor which is formed in coil 50 due to heat exchange with the hot vapor passing thereover and the hot solution flowing therethrough.

Generator 16 comprises a shell 56 having fins 58 suitably affixed thereto as by welding. The generator is heated by a gas burner 86 or other suitable heating means. The weak solution is boiled in generator 16 to concentrate the solution thereby forming a strong solution and refrigerant vapor.

The hot strong absorbent solution passes upwardly through the analyzer section of generator 16 through analyzer coil 60 in heat exchange with weak solution passing downwardly over the coil. The warm strong solution then pases through heat exchange coil 52 within coil 50, line 38 into combination liquid suction heat exchanger-vapor distributor 18. A restrictor 62 is provided in line 38 so that the solution supplied to combination liquid suction heat exchanger-vapor distributor is at the same pressure as the vapor in passage 36.

Refrigerant vapor formed in generator 16 passes upwardly through the analyzer section thereof where it is concentrated by mass heat transfer with weak solution passing downwardly over analyzer coil 60. Analyzer plates 64 in generator 16 provide a tortuous path for flow of solution and vapor to assure intimate contact therebetween to improve the mass heat transfer. The refrigerant vapor from the analyzer section passes through reflux plate 66 in heat exchange relation with absorbent condensed within rectifier 54. The vapor then passes through rectifier 54 in heat exchange relation with the weak solution passing through coil 50. Absorbent condensed in rectifier 54 flows downwardly onto plate 66 where it is heated by the refrigerant vapor passing therethrough. The heated absorbent is then passed to the generator along with the weak solution discharged into the generator from coil 50. Refrigerant vapor passes from rectifier 54 through line 68 to condenser 12 to complete the refrigeration cycle.

Figure 2:
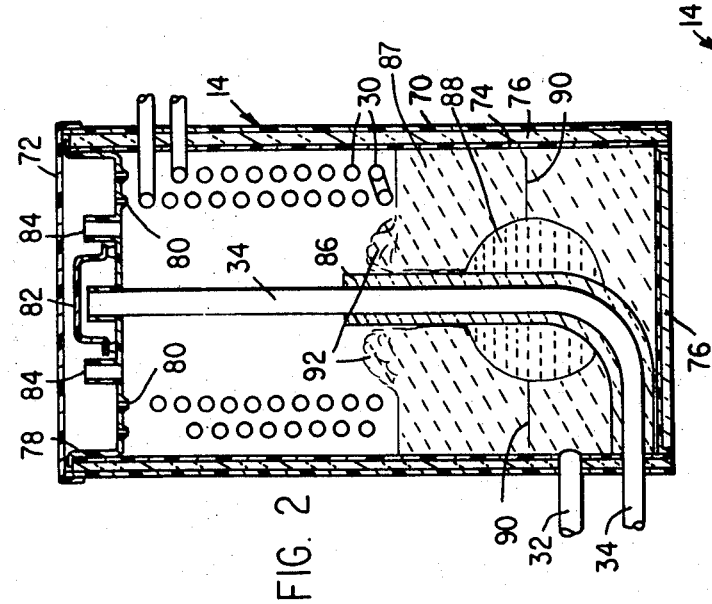
FIG. 2 is a sectional view of the water chiller employed in the refrigeration machine of FIG. 1.

The water chiller 14 as illustrated in FIG. 2 comprises an outer cylindrical shell 70 having a top member 72 secured thereto. A cylindrical liner 74 is disposed within shell 70 in spaced relation thereto. A suitable insulating material 76 such as urethane foam is provided between shell 70 and liner 74 and on the bottom of the liner. The insulation is preferably foamed in place to form a complete assembly. The heat exchanger 30 in chiller 14 is disposed within liner 74 for passage of refrigerant therethrough. A distribution tray 78 which is disposed above heat exchanger 30 receives water returned from the remote heat exchangers through return water line 34. Distribution tray 78 is provided with two concentric rows of downwardly directed nozzles 80 which are aligned above the two rows of heat exchanger 30 for discharge of water from tray 78 onto the heat exchanger. A cap 82 is suitably affixed to tray 78 to deflect the stream of water from line 34 downward into tray 78. Overflow towers 84 are provided on tray 78 to prevent an excessive accumulation of water therein. A resilient sleeve 86 is provided on line 34 to prevent ice damage to the chiller.

The chiller 14 is provided with thicker insulation in the side walls than on the bottom. Therefore when ambient temperatures drop rapidly below the freezing point of water, any air in the chiller above the water serves as an insulator to prevent immediate freezing of the top surface of the water. Since the insulation in the bottom of the chiller is thinner than the side wall insulation, freezing of the water in the chiller would progress from the bottom of the chiller in an upward direction, allowing upward expansion of the ice as it is formed to prevent damage to the chiller.

However when ambient temperatures drop a few degrees below freezing and remain there for a long period of time, the air in the chiller above the water level will cool down to ambient temperature and will not serve as insulation for the top surface of the water in the chiller. Under these conditions, ice will form in the top and bottom portions of the collected water in the chiller and freeze inward toward the center. At some time during the freezing process, an ice block 87 having a central section of unfrozen water 88 as illustrated in FIG. 2 will be formed. Further freezing will create pressure on the unfrozen portion of the water. If this pressure is not relieved, it has been found that the pressure will cause the ice block to split, ordinarily along the line 90, which will force the top portion of the ice block upwardly into heat exchanger 30 causing considerable damage thereto. By utilizing a central resilient column comprised of line 34 having resilient sleeve 86 disposed thereon, the water pressure will compress resilient sleeve 86 to create a path between the sleeve 86 and the ice block surrounding the sleeve to allow the water in the central portion of the ice block to escape upwardly and freeze on the top surface of the ice block in a hill shaped formation 92. This will prevent the ice block from splitting along line 90 and therefore prevent ice damage to the heat exchanger 30. The resilient sleeve 86 also allows the ice to expand somewhat in a radially inward direction to reduce the stresses which ordinarily would be caused by the expansion of ice against the walls of the chiller.

While I have described a preferred embodiment of my invention it is to be understood that the invention is not limited thereto but may be otherwise embodied within the scope of the following claims.

I claim:
1. An absorption refrigeration machine including a generator, absorber, condenser and chiller connected to provide refrigeration, said chiller comprising
   a casing
   a heat exchange coil disposed in said casing for passage of refrigerant therethrough in heat exchange relation with water passed over the exterior of the coil,
   a vertical water supply line centrally disposed within said casing to supply water to the upper portion thereof, and
   a resilient sleeve surrounding said water supply line, said sleeve being adapted to deform under pressure created by expansion of the ice formed in the chiller to allow a portion of the unfrozen water in the center of the ice to escape upwardly along said sleeve to the top surface of the ice.

2. An absorption refrigeration machine according to claim 1 wherein said heat exchange coil is in the shape of a helix, a distribution tray disposed in said chiller above said coil adapted to receive water from said supply line, said tray having a plurality of openings therein for discharge of water over the surface of said coil.

References Cited

UNITED STATES PATENTS

| | | | |
|---|---|---|---|
| 2,762,209 | 9/1956 | Bennett | 62—394 |
| 3,461,684 | 8/1969 | Simpson | 62—394 |
| 3,183,967 | 5/1965 | Mettenleiter et al. | 165—84X |
| 3,236,064 | 2/1966 | Whitlow | 62—476 |
| 3,299,669 | 1/1967 | Merrick | 62—476 |
| 3,435,627 | 4/1969 | Castillo | 62—394X |

MEYER PERLIN, Primary Examiner

P. D. FERGUSON, Assistant Examiner

U.S. Cl. X.R.

62—399; 165—134